United States Patent
Feng et al.

(10) Patent No.: US 9,363,274 B2
(45) Date of Patent: Jun. 7, 2016

(54) METHODS AND SYSTEMS FOR BROADCASTING PICTURES

(71) Applicant: TENCENT TECHNOLOGY (SHENZHEN) COMPANY LIMITED, Shenzhen (CN)

(72) Inventors: Feng Feng, Shenzhen (CN); Yuxun Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 215 days.

(21) Appl. No.: 14/186,335

(22) Filed: Feb. 21, 2014

(65) Prior Publication Data
US 2014/0298017 A1  Oct. 2, 2014

Related U.S. Application Data

(63) Continuation of application No. PCT/CN2013/088792, filed on Dec. 6, 2013.

(30) Foreign Application Priority Data

Mar. 27, 2013 (CN) .......................... 2013 1 0102193

(51) Int. Cl.
*H04L 29/06* (2006.01)
(52) U.S. Cl.
CPC .......... *H04L 63/126* (2013.01); *H04L 65/1079* (2013.01)

(58) Field of Classification Search
CPC .. H04H 2201/90; H04H 60/52; H04L 9/3247; H04L 2209/608; H04L 63/126; H04L 65/1079
USPC .............................................. 713/168; 726/7
See application file for complete search history.

(56) References Cited

U.S. PATENT DOCUMENTS

| | | | | | |
|---|---|---|---|---|---|
| 5,999,711 | A | * | 12/1999 | Misra | ...................... G06F 21/33 719/310 |
| 2001/0037454 | A1 | * | 11/2001 | Botti | ...................... G06F 21/64 713/176 |
| 2008/0249961 | A1 | * | 10/2008 | Harkness | ........... G06Q 30/0283 705/400 |

FOREIGN PATENT DOCUMENTS

| | | |
|---|---|---|
| CN | 101321066 A | 12/2008 |
| CN | 201674570 U | 12/2010 |
| CN | 102340401 A | 2/2012 |

(Continued)

OTHER PUBLICATIONS

The World Intellectual Property Organization (WIPO) International Search Report for PCT/CN2013/088792 Mar. 13, 2014.
The State Intellectual Property Office of the People's Republic of China (SIPO) Office Action 1 for 201310102193.7 Jun. 1, 2015.

(Continued)

*Primary Examiner* — Yogesh Paliwal
(74) *Attorney, Agent, or Firm* — Anova Law Group, PLLC

(57) ABSTRACT

A method and system for broadcasting pictures across multiple user terminals are provided. The method includes generating a user signature based on information associated with the picture, and receiving a request to broadcast the picture, the request including the user signature. The method further includes broadcasting the picture if the user signature is valid. The method and system may improve a user's online experience by eliminating unauthorized broadcasts from unauthorized users.

12 Claims, 5 Drawing Sheets

(56) References Cited

FOREIGN PATENT DOCUMENTS

| | | |
|---|---|---|
| CN | 102594563 A | 7/2012 |
| CN | 102695146 A | 9/2012 |
| CN | 103188084 A | 7/2013 |

OTHER PUBLICATIONS

The State Intellectual Property Office of the People's Republic of China (SIPO) Office Action 2 for 201310102193.7 Sep. 22, 2015.
The State Intellectual Property Office of the People's Republic of China (SIPO) Office Action 3 for 201310102193.7 Mar. 2, 2016.

* cited by examiner

METHODS AND SYSTEMS FOR BROADCASTING PICTURES

CROSS-REFERENCES TO RELATED APPLICATIONS

Related Applications

This application is a continuation application of PCT Patent Application No. PCT/CN2013/088792, filed on Dec. 6, 2013, which is based upon and claims the benefit of priority from Chinese Patent Application No. 201310102193.7, filed on Mar. 27, 2013, the entire contents of all of which are incorporated herein by reference.

FIELD OF THE INVENTION

The present disclosure relates to Internet browser technologies and, more particularly, to methods and systems for broadcasting pictures.

BACKGROUND

With the development of Internet related technologies, users have access to more and more online applications. For example, instant message applications, such as Tencent QQ, support communications among multiple users using text, audio, or video data. Such applications may also be used to play multiple-player computer games online, as well as support multiple-user collaborations in an office or family setting.

In one example, a user may use an instant message application to broadcast pictures, such as local screenshots, or custom pictures, to users in one online meeting room. The user may first upload the picture from a user terminal to a server. A broadcast server may then broadcast the picture to all users in the online meeting room. The user terminal, however, could be attacked and compromised at times. If an attacker breaks into the instant message application, the attacker may send requests to broadcast pictures to the broadcast server. The users in the online meeting room may then receive pictures from the attacker and be harassed by the attacker. This type of uninvited broadcastings may be referred to as malicious requests.

To screen out malicious broadcasting requests, when receiving a user's request to broadcast, the broadcast server may check the user's IP address, user name, or may limit the number of broadcasting requests from the user that can be processed. Nevertheless some malicious requests may still pass these kinds of tests by the broadcast server. As a result, user experience may be compromised.

The disclosed method and system are directed to solve one or more problems set forth above and other problems.

BRIEF SUMMARY OF THE DISCLOSURE

Embodiments consistent with the present disclosure provide a method, system, terminal device, or a server for broadcasting pictures. Embodiments consistent with the present disclosure improve the user experience by securely managing the broadcasting process.

One aspect of the present disclosure provides a method for broadcasting pictures. The method includes generating a user signature based on information associated with the picture, and receiving a request to broadcast the picture, the request including the user signature. The method further includes broadcasting the picture if the user signature is valid.

Another aspect of the present disclosure provides a system for broadcasting a picture across multiple user terminals. The system includes a user terminal configured to send a picture to an uploading server; an uploading server configured to generate a user signature and send the user signature to the user terminal wherein after receiving the user signature; and a broadcast server configured to receive a request to broadcast to from the user terminal with the user signature and broadcast the picture if the use signature sent with the broadcasting request is valid.

Another aspect of the present disclosure provides a server for broadcasting a picture across multiple user terminals. The broadcast server includes a receiving unit configured to receive a broadcasting request from a user terminal to broadcast a picture, the broadcasting request including a user signature, wherein the user signature is generated by an uploading server based on information associated with the picture; and a broadcast unit configured to broadcast the picture if the user signature is valid.

Embodiments consistent with the present disclosure provide a system and a method for broadcasting user pictures. The server of the picture broadcasting system may generate a user signature. The user terminal may send a request to broadcast to the server. The broadcasting request may include the user signature. If the server determines that the signature included in the request is valid, the server may broadcast the picture. Embodiment consistent with the present disclosure may filter out malicious requests by validating the user signature, lessen the impact of malicious broadcasting requests on the system, reduce the cost associated with handling malicious broadcasting requests, and reduce the risk of being attacked by malicious broadcasting requests. Embodiments consistent with the present disclosure may thus improve the user experience in instant message applications.

Other aspects of the present disclosure can be understood by those skilled in the art in light of the description, the claims, and the drawings of the present disclosure.

BRIEF DESCRIPTION OF THE DRAWINGS

To illustrate embodiments of the invention, the following are a few drawings illustrating embodiments consistent with the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

In the present disclosure, a terminal device, a user terminal, and a terminal are used interchangeably to refer to any computing device that may communicate with another computing device. Exemplary user terminals may include a Personal Computer, a Laptop Computer, a smartphone, a tablet computer, etc.

Figure 6:
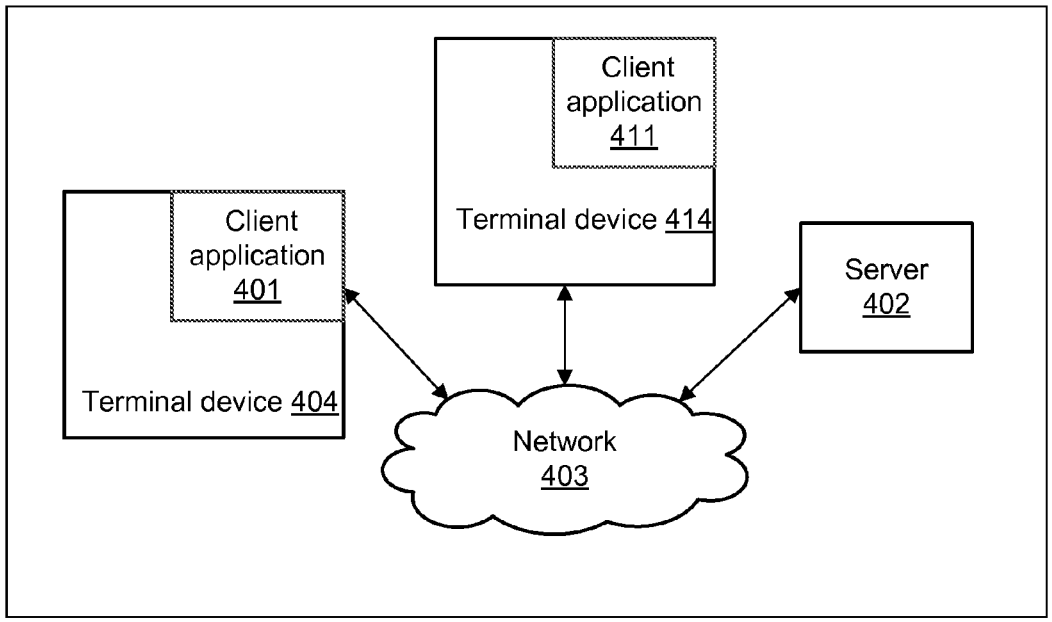
FIG. 6 illustrates an exemplary operating environment incorporating certain disclosed embodiments.

FIG. 6 illustrates an exemplary online computer environment 400 incorporating certain disclosed embodiments. As shown in FIG. 6, environment 400 may include terminal devices 404 and 414, a network 403, and a server 402. The network 403 may include any appropriate type of communication network for providing network connections to the terminal devices 404 and 414, and the server 402. For example, network 403 may include the Internet, LAN (Local Area Network), or other types of computer networks or telecommunication networks, either wired or wireless.

A server, as used herein, may refer to one or more server computers configured to provide certain functionalities, which may require any user accessing the services to authenticate to the server before the access. A server may also include one or more processors to execute computer programs in parallel. The server 402 may include any appropriate server computers configured to provide certain server functionalities, such as storing pictures submitted by a user to be broadcasted. Although only one server is shown, any number of servers can be included. The server 402 may operate in a cloud or non-cloud computing environment.

Terminal devices 404 and 414 may include any appropriate type of network computing devices, such as PCs, tablets, smartphones, network TVs, etc. Terminal devices 404 and 414 may include one or more client applications 401 and 411. The client applications 401 and 411, as used herein, may include any appropriate software application, hardware application, or a combination thereof to achieve certain client functionalities, such as sending pictures to be broadcasted in an online meeting room. For example, client applications 401 and 411 may be an instant message application such as Tencent QQ. Any number of client applications 401 and 411 may be included in the environment 400.

In one embodiment, the terminal device 404 may connect to a server 402 to upload or download pictures. A user may use client application 401 to send a request to server 402 to broadcast a picture to the users in an online meeting room. Terminal device 414 may be used by another user in the online meeting room. Terminal device 414 may then receive the broadcast with the picture from the server.

Figure 7:
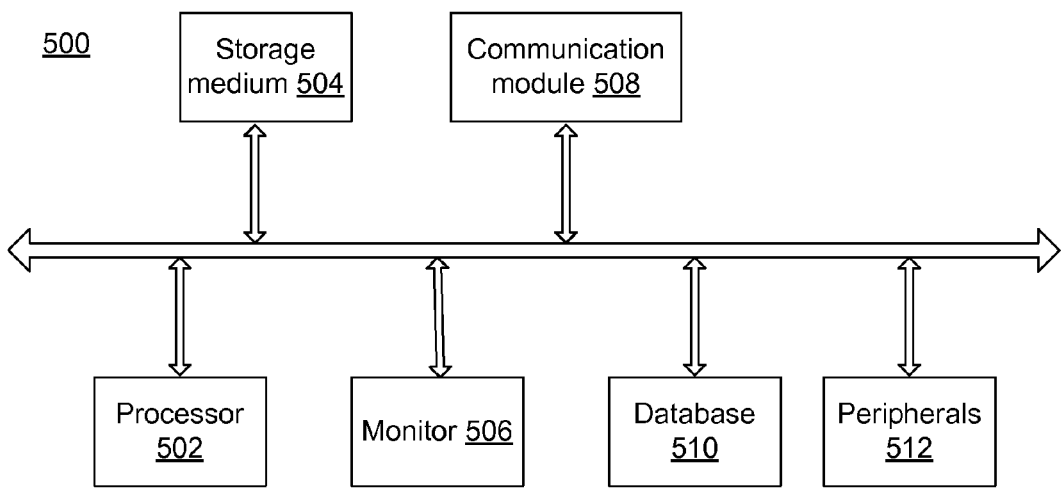
FIG. 7 illustrates a block diagram of an exemplary computer system consistent with the disclosed embodiments.

Terminal devices 404/414 and server 402 may be implemented on any appropriate computing platform. FIG. 7 illustrates a block diagram of an exemplary computer system 500 capable of implementing terminal devices 404/414 and server 402.

As shown in FIG. 7, computer system 500 may include a processor 502, a storage medium 504, a monitor 506, a communication module 508, a database 510, and peripherals 512. Certain devices may be omitted and other devices may be included.

Processor 502 may include any appropriate processor or processors. Further, processor 502 can include multiple cores for multi-thread or parallel processing. Storage medium 504 may include memory modules, such as Read-only memory (ROM), Random Access Memory (RAM), flash memory modules, and erasable and rewritable memory, and mass storages, such as CD-ROM, U-disk, and hard disk, etc. Storage medium 504 may store computer programs for implementing various processes, when executed by processor 502.

Further, peripherals 512 may include I/O devices such as keyboard and mouse, and communication module 508 may include network devices for establishing connections through the communication network. Database 510 may include one or more databases for storing certain data and for performing certain operations on the stored data, such as database searching.

Figure 1A:
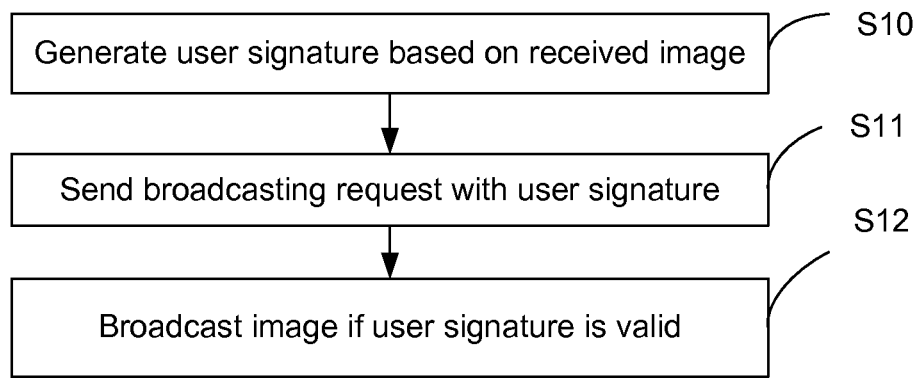
FIG. 1A is a flowchart of a method for broadcasting pictures implemented by an exemplary embodiment consistent with the present disclosure.

In operation, the terminal device/client application 404/401 may submit to or retrieve data supporting broadcasting pictures from server 402. FIG. 1A shows a flow chart of a method for broadcasting pictures implemented by embodiments consistent with the present disclosure. As discussed in relation to FIGS. 6 and 7 above, a system for broadcasting pictures implementing such a method may include one or more user terminal devices and one or more servers implementing broadcasting functions. The user terminal devices may also be referred to as user terminals. The method shown in FIG. 1A includes steps S10-S12.

In step S10, a user terminal of the picture broadcasting system may obtain user signature information based on a received picture from a user. In this embodiment, step S10 may further include the following steps. The user may request that the system broadcast a picture. The server in the picture broadcasting system may create a user signature in response to the user's request to broadcast. The user signature may be based on the IP address of the user terminal, a time stamp, and information associated with the picture to be broadcasted, etc. The server may further encrypt the user signature using various algorithms, such as an encryption based on a dynamic security key. The server may send the user signature to the user terminal. The server may also save the picture and the user signature.

In step S11, the user terminal of the picture broadcasting system may send the broadcasting request with the user signature to the server.

In step S12, the serve of the picture broadcasting system may validate the user signature. If the user signature is valid, the server may broadcast the picture as requested by the user. When the server validates the user signature, it may first check whether it has the user signature in its storage. If not, the server may first obtain the user signature from the user terminal. Once the server obtained the user signature, it may then compare the user signature with the user signature included in the broadcasting request. In this embodiment, the server may determine that the user signature included in the broadcasting request is valid if the signature included matches the user signature obtained from the user terminal. The server may determine that the user signature included in the broadcasting request is invalid if the signature included does not match the user signature obtained from the user terminal.

If the server has the user signature in its storage, it may retrieve the signature and compare it with the user signature included in the broadcasting request. In this embodiment, the server may determine that the user signature included in the broadcasting request is valid if the signature included matches the user signature stored in the server. The server may determine that the user signature included in the broadcasting request is invalid if the signature included does not match the user signature stored in the server.

In certain embodiments, the server may send a message denying the broadcasting request to the user terminal if the user signature in the request is invalid.

Embodiments consistent with the present disclosure may provide a method for broadcasting user pictures. The server of the picture broadcasting system may generate a user signature. The user terminal may send a request to broadcast to the server. The broadcasting request may include the user signature. If the server determines that the signature included in the request is valid, the server may broadcast the picture. Embodiment consistent with the present disclosure may filter out malicious requests by validating the user signature, lessen the impact of malicious broadcasting requests on the system, reduce the cost associated with handling malicious broadcasting requests, and reduce the risk of being attacked by malicious broadcasting requests. Embodiments consistent with the present disclosure may thus improve the user experience in instant message applications.

Figure 1B:
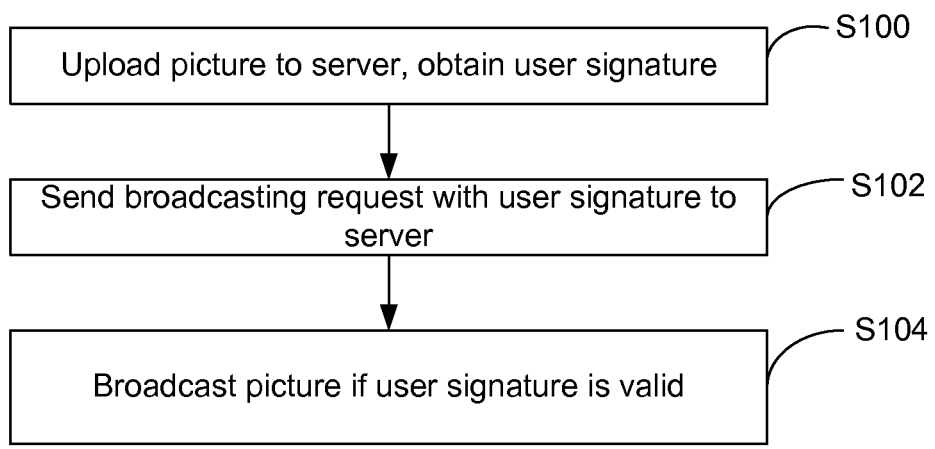
FIG. 1B is another flowchart of a method for broadcasting pictures implemented by an exemplary embodiment consistent with the present disclosure.

FIG. 1B shows a flow chart of a method for broadcasting pictures consistent with the present disclosure. The method includes steps S100-S104. In this embodiment, a user uses voice features in an instant message application. Often multiple users may engage the voice feature in the instant message application. Each user may need to log in using a user identification and a password. In this embodiment, every instant message application may communicate with an uploading server and a broadcast server. The uploading server and the broadcast server may communicate with each other. In addition, in this embodiment, the instant message applications may include, but are not limited to, Tecent QT Voice. Further, in this example, QT Voice and user terminals installed with QT Voice (QT Voice user terminals) are used to describe the exemplary embodiment.

In this embodiment, after a group of users establishes a conversation group on QT Voice, one user may broadcast a picture to the group. The broadcast server may broadcast the submitted picture to the group. The broadcast server may send the picture to all QT Voice user terminals in the conversation group. The QT Voice user terminals may present the picture to the users once it receives the picture from the broadcast server.

In step S100, the user may use its QT Voice user terminal to upload a picture to the uploading server. The QT Voice user terminal may then retrieve a user signature from the uploading server. In this example, the user uses QT Voice user terminal to upload a picture to the uploading server. The uploading server may store the picture after receiving it. The uploading server may then generate a user signature in response to the user's request to broadcast. The uploading server may then send the user signature back to the QT Voice user terminal.

In this embodiment, the user signature may be based on the IP address of the QT Voice user terminal, a time stamp, and information associated with the picture to be broadcasted, etc. The uploading server may further encrypt the user signature using various algorithms, such as using a dynamic security key. The uploading server may then send the encrypted user signature back to the QT Voice user terminal. In addition, when the uploading server generates the user signature, it may then send a copy of the signature to the broadcast server. The broadcast server may store the user signature.

In step S102, the user may use the QT Voice user terminal to request that the picture be broadcasted. In this example, the QT Voice user terminal may send the broadcasting request to the broadcast server after it receives the user signature from the uploading server. The request may include the picture and the user signature.

In step S104, if the broadcast server determines that the user signature included in the broadcasting request is valid, it may then broadcast the picture. In this example, once the QT server receives the broadcasting request, it validates the user signature.

When the broadcast server validates the user signature, it may first check whether it has the user signature in its storage. If not, the broadcast server may first obtain the user signature from the uploading server. Once the server obtained the user signature, it may then compare the user signature obtained from the uploading server with the user signature included in the broadcasting request. In this embodiment, the broadcast server may determine that the user signature included in the broadcasting request is valid if the signature included matches the user signature obtained from the uploading server. The server may determine that the user signature included in the broadcasting request is invalid if the signature included does not match the user signature obtained from the uploading server.

When the uploading server generates a user signature, it may send a copy to be stored in the broadcast server. If the broadcast server has the user signature in its storage, it may retrieve that signature and compare it with the user signature included in the broadcasting request. In this embodiment, the broadcast server may determine that the user signature included in the broadcasting request is valid if the signature included matches the user signature stored in the server. The broadcast server may determine that the user signature included in the broadcasting request is invalid if the signature included does not match the user signature stored in the broadcast server.

In this embodiment, if the broadcast server determines that the user signature included in the broadcasting request is valid, the broadcast server may retrieve the picture from the uploading server and then broadcast the picture to the QT Voice user terminals. When the broadcast server determines that the user signature included in the broadcasting request is invalid, the broadcast server may send a message to the QT Voice terminal requesting the broadcast, denying the broadcasting request.

Embodiments consistent with the present disclosure provide a method for broadcasting user pictures using QT Voice user terminals. The QT Voice user terminal may upload a broadcasting request to the uploading server. The uploading server may generate a user signature and send a copy of the user signature to the broadcast server. The QT Voice user terminal may send a request to broadcast to the broadcast server. The broadcasting request may include the user signature. If the broadcast server determines that the signature included in the request is valid, the broadcast server may broadcast the picture. Embodiment consistent with the present disclosure may therefore filter out malicious requests by validating user signatures, reduce the impact of malicious broadcasting requests on the system, reduce the cost associated with handling malicious broadcasting requests, and reduce the risk of being attacked by malicious broadcasting requests. Accordingly, embodiments consistent with the present disclosure may improve the user experience in instant message applications.

Figure 2:
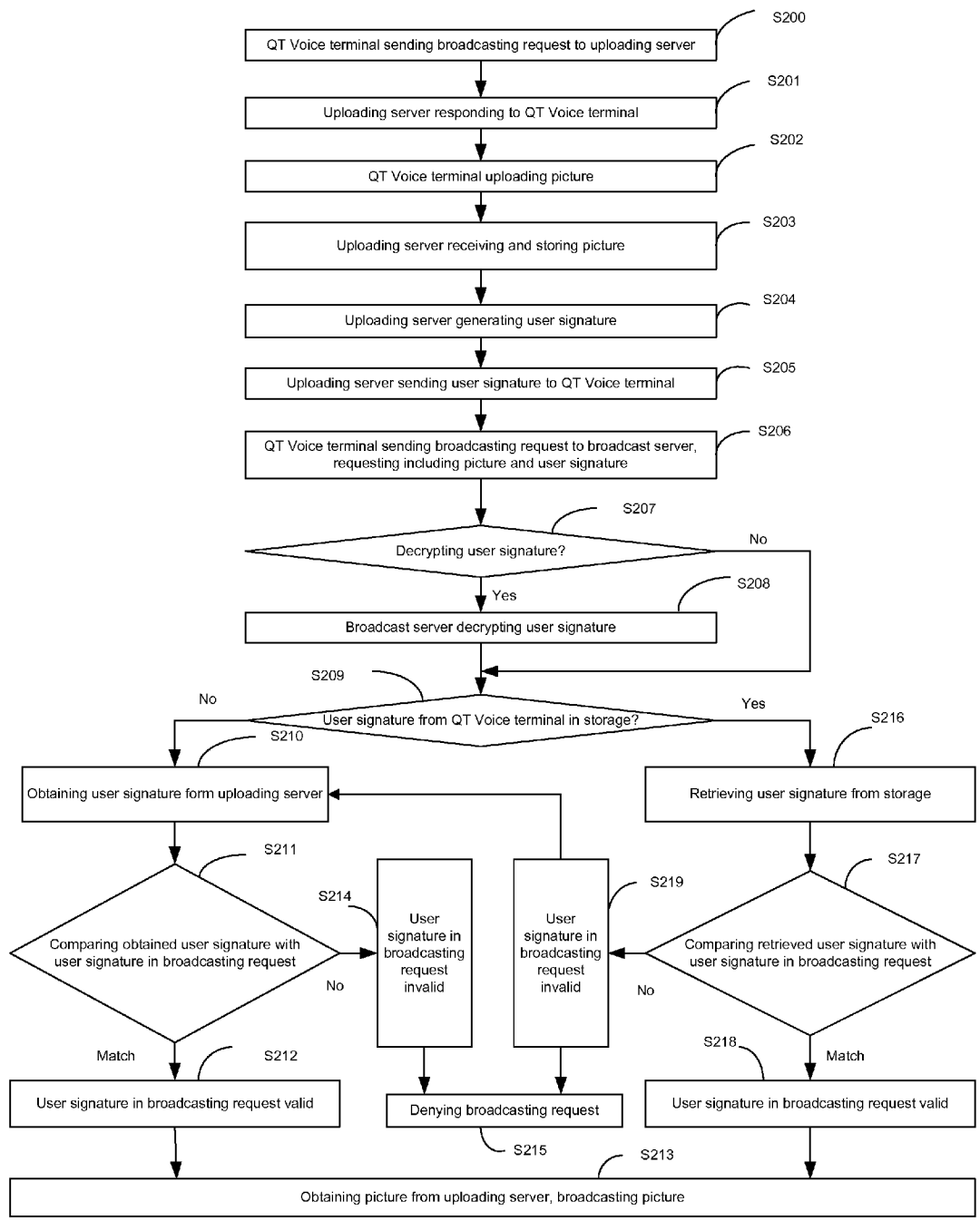
FIG. 2 is another flowchart of a method for broadcasting pictures implemented by an exemplary embodiment consistent with the present disclosure.

FIG. 2 shows another flow chart of a method for broadcasting pictures implemented by embodiments consistent with the present disclosure. The method includes steps S200-S213. In this embodiment, a user uses voice features in an instant message application. Often multiple users may engage the voice feature in the instant message application. Each user may need to log in using a user identification and a password. In this embodiment, every instant message application may communicate with an uploading server and a broadcast server. The uploading server and the broadcast server may communicate with each other. In addition, in this embodiment, the instant message applications may include, but are not limited to, Tencent QT Voice. Further, in this example, QT Voice and user terminals installed with QT Voice (QT Voice user terminals) are used to describe the exemplary embodiment.

In this embodiment, once a group of users establishes a conversation group on QT Voice, one user may broadcast a picture to the group. The broadcast server may broadcast the submitted picture to the group. The broadcast server may send the picture to all QT Voice user terminals in the conversation group. The QT Voice user terminals may present the picture to the users once it receives the picture from the broadcast server.

For example, during a conference call held among the users of the QT Voice application, one user may need to broadcast a picture to other users on the conference call to facilitate a discussion. The user may send the broadcasting request to the broadcast server. The broadcast server may broadcast the submitted picture to the group. The broadcast server may send the picture to all QT Voice user terminals in the conversation group. The QT Voice user terminals may present the picture to the users once it receives the picture from the broadcast server.

In another example, two users have a conversation using QT Voice. One user may need to broadcast a picture to the other user in the conversation. The user may send the broadcasting request to the broadcast server. The broadcast server may broadcast the submitted picture to the other user. The broadcast server may send the picture to the other QT Voice user terminal in the conversation group. The QT Voice user terminal may present the picture to the other user once it receives the picture from the broadcast server. The above examples are used for description purposes only, without limiting the present disclosure.

In this embodiment, in step S200, a user may use a QT Voice user terminal to send a broadcasting request to an uploading server. The broadcasting request asks the server to broadcast a picture.

In step S201, the uploading server may respond to the broadcasting request from the QT Voice user terminal. In this example, the uploading server's response may be an instruction to upload the picture that is to be broadcasted.

In step S202, the user may use the QT Voice user terminal to upload the to be broadcasted picture to the uploading server. The picture may be a local screen shot or a custom picture. In this example, once the QT voice user terminal receives the response from the uploading server, it may start to upload the picture to be broadcasted.

In step S203, the uploading server may receive the picture and store it in storage. In this example, the uploading server may store the picture using the QT Voice user terminal's ID or the ID of the user who submitted the picture.

In step S204, the uploading server may generate a user signature. The user signature may be based on the IP address of the user terminal, a time stamp, and information associated with the picture to be broadcasted, etc. In this example, if the network environment is very safe, the picture broadcasting system may not need to encrypt the user signature.

In step S205, the uploading server may send the user signature to the QT Voice user terminal. If the uploading server has encrypted the user signature, then the uploading server may send the encrypted user signature back to the QT Voice user terminal. In this example, once the QT Voice user terminal receives the user signature from the uploading server, the uploading server may also send a copy of the user signature to the broadcast server. The broadcast server may store the user signature.

In step S206, the user may use QT Voice user terminal to send the picture to be broadcasted and the user signature to the broadcast server. In this example, the user may use the QT Voice user terminal to send the picture to be broadcasted and the user signature to the broadcast server once it receives the user signature from the uploading server. Further, in this example, the QT Voice user terminal may insert the user signature into a blank section of the picture and send the picture with the embedded signature to the broadcast server.

In step S207, the broadcast server may determine whether it needs to decrypt the user signature. In this example, the broadcast server may need to make the determination because the user signature may or may not be encrypted. In addition, when the broadcast server determines that it needs to decrypt the user signature, it executes step S208. If not, it executes step S209.

In step S208, the broadcast server may decrypt the user signature. In this example, the broadcast server may first separate the user signature from the picture that included the signature. The broadcast server may then decrypt the user signature.

In step S209, the broadcast server may determine whether it has the user signature of the requesting QT Voice user terminal in its storage. In this example, if the broadcast server does not have the signature in this storage, then it would execute step S210. If the broadcast server has the signature in this storage, then it would execute step S216.

In step S210, the broadcast server may obtain from the uploading server the user signature of the requesting QT Voice user terminal, and then the flow enters into step S219. In this embodiment, the broadcast server may send an instruction to the uploading server to obtain the signature. When the uploading server receives the instruction, it may send the user signature of the requesting QT Voice user terminal to the broadcast server.

In step S211, the broadcast server may compare the user signature of the requesting QT Voice user terminal with the signature included in the broadcasting request. When the two signatures match, the broadcast server would execute step S212. If not, the broadcast server would execute step S214.

In step S212, if the user signature of the requesting QT Voice user terminal matches the signature included in the broadcasting request, the broadcast server may determine that the signature included in the broadcasting request is valid.

In step S213, the broadcast server may obtain the picture from the uploading server the picture sent by the QT Voice user terminal. The broadcast server may then broadcast the picture. In this example, multiple QT Voice terminals are in the online conversation group using voice features. The broadcast server may broadcast the submitted picture to all QT Voice terminals other than the submitting terminal. The QT Voice terminals may then display the picture to the users.

In step S214, if the user signature of the requesting QT Voice user terminal does not match the user signature included in the broadcasting request, the broadcast server may determine that the signature included in the broadcasting request is invalid. In step S215, the broadcast server may deny the broadcasting request if the signature included in the broadcasting request is invalid.

In step S216, the broadcast server may retrieve the user signature from its storage if it determines that it has the user signature of the requesting QT Voice user terminal in its storage. In step S217, the broadcast server may compare the user signature of the requesting QT Voice user terminal with the signature included in the broadcasting request. When the two signatures match, the broadcast server would execute step S218. If not, the broadcast server would execute step S219.

In step S218, if the user signature of the requesting QT Voice user terminal matches the signature included in the broadcasting request, the broadcast server may determine that the signature included in the broadcasting request is valid. The broadcast server may then execute step S213.

In step S219, if the user signature of the requesting QT Voice user terminal does not match the user signature included in the broadcasting request, the broadcast server may determine that the signature included in the broadcasting request is invalid. The broadcast server may then execute step S215. Alternatively, the broadcast server may determine that the requesting QT Voice user terminal in its storage is outdated, and would then execute step S210.

Embodiments consistent with the present disclosure provide a method for broadcasting user pictures using QT Voice user terminals. The QT Voice user terminal may send a broadcasting request to the uploading server. The uploading server may generate a user signature and send a copy of the user signature to the broadcast server. The QT Voice user terminal may send a request to broadcast to the broadcast server. The broadcasting request may include the user signature. If the broadcast server determines that the signature included in the request is valid, the broadcast server may broadcast the picture. Embodiment consistent with the present disclosure may therefore filter out malicious requests by validating user signatures, reduce the impact of malicious broadcasting requests on the system, reduce the cost associated with handling malicious broadcasting requests, and reduce the risk of being attacked by malicious broadcasting requests. Accordingly, embodiments consistent with the present disclosure may improve the user experience in instant message applications.

Figure 3:
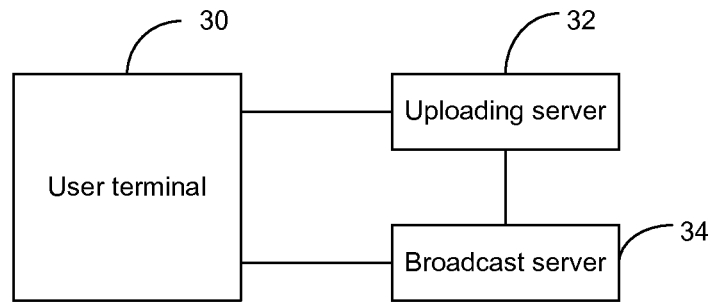
FIG. 3 is a schematic diagram of an exemplary system for broadcasting pictures consistent with the present disclosure.

FIG. 3 shows a schematic diagram for a picture broadcasting system consistent with the embodiments of the present disclosure. In this example, the picture broadcasting system includes a user terminal 30, an uploading server 32, and a broadcast server 34. The user terminal 30, the uploading server 32, and the broadcast server 34 can communicated with each other.

In this example, the user terminal 30 may send a picture to the uploading server 32. The uploading server 32 may generate a user signature associated with the received picture. The user signature may be based on the IP address of the user terminal 30, a time stamp, and information associated with the picture to be broadcasted, etc.

The user terminal 30 may obtain the user signature from the uploading server 32. The user terminal 30 may then send a request to the broadcast server 34 to broadcast the picture. The request may include the picture to be broadcasted and the associated user signature. The broadcast server 34 may broadcast the submitted picture if it determines that the user signature included in the broadcasting request is valid.

In this embodiment, the broadcast server 34 may validate the user signature. It may first check whether it has the user signature of user terminal 30 in its storage. If not, the broadcast server 34 may first obtain the user signature from the uploading server 32. Once the server 34 obtains the user signature it may then compare the user signature obtained from the uploading server 32 with the user signature included in the broadcasting request. In this embodiment, the broadcast server 34 may determine that the user signature included in the broadcasting request is valid if the signature included matches the user signature obtained from the uploading server 32. The broadcast server 34 may determines that the user signature included in the broadcasting request is invalid if the signature included does not match the user signature obtained from the uploading server 32.

Alternatively, the broadcast server 34 may have the user signature of user terminal 30 in its storage. If so, the broadcast server 34 may first retrieve the user signature from its storage. Once the server 34 retrieved the user signature it may then compare the user signature obtained from the uploading server 32 with the user signature included in the broadcasting request. In this embodiment, the broadcast server 34 may determine that the user signature included in the broadcasting request is valid if the signature included matches the user signature obtained from the uploading server. The broadcast server 34 may determines that the user signature included in the broadcasting request is invalid if the signature included does not match the user signature obtained from the uploading server 32.

Further, the broadcast server 34 may determine whether it needs to decrypt the user signature. If so, the broadcast server 34 may decrypt the user signature and then validate the user signature after the decryption.

If the broadcast server 34 determines that the user signature included in the broadcasting request is valid, the broadcast server 34 may retrieve the picture from the uploading server 32 and then broadcast the picture to user terminals 30.

In this embodiment, the uploading server 32 may store the picture after receiving it from user terminal 30. The uploading server 32 may then generate a user signature in response to the user's request to broadcast. The uploading server 32 may then send the user signature back to the user terminal 30. The uploading server 32 may further encrypt the user signature using various algorithms, such as using a dynamic security key. The uploading server 32 may then send the encrypted user signature back to the user terminal 30. In addition, when the uploading server 32 generates the user signature, it may then send a copy of the signature to the broadcast server 34. The broadcast server 34 may store the user signature. The broadcast server 34 may decrypt the user signature. In this example, the broadcast server 34 may first separate the user signature from the picture that included the signature. The broadcast server 34 may the decrypt the user signature.

When the broadcast server 34 determines that the user signature included in the broadcasting request is invalid, the broadcast server 34 may send a message to the user terminal 30 requesting the broadcast, denying the broadcasting request.

Embodiments consistent with the present disclosure provide a method for broadcasting user pictures using user terminals. The user terminal may upload a broadcasting request to the uploading server. The uploading server may generate a user signature and send a copy of the user signature to the broadcast server. The user terminal may send a request to broadcast to the broadcast server. The broadcasting request may include the user signature. If the broadcast server determines that the signature included in the request is valid, the broadcast server may broadcast the picture. Embodiment consistent with the present disclosure may therefore filter out malicious requests by validating user signatures, reduce the impact of malicious broadcasting requests on the system, reduce the cost associated with handling malicious broadcasting requests, and reduce the risk of being attacked by malicious broadcasting requests. Accordingly, embodiments consistent with the present disclosure may improve the user experience in instant message applications.

Figure 4:
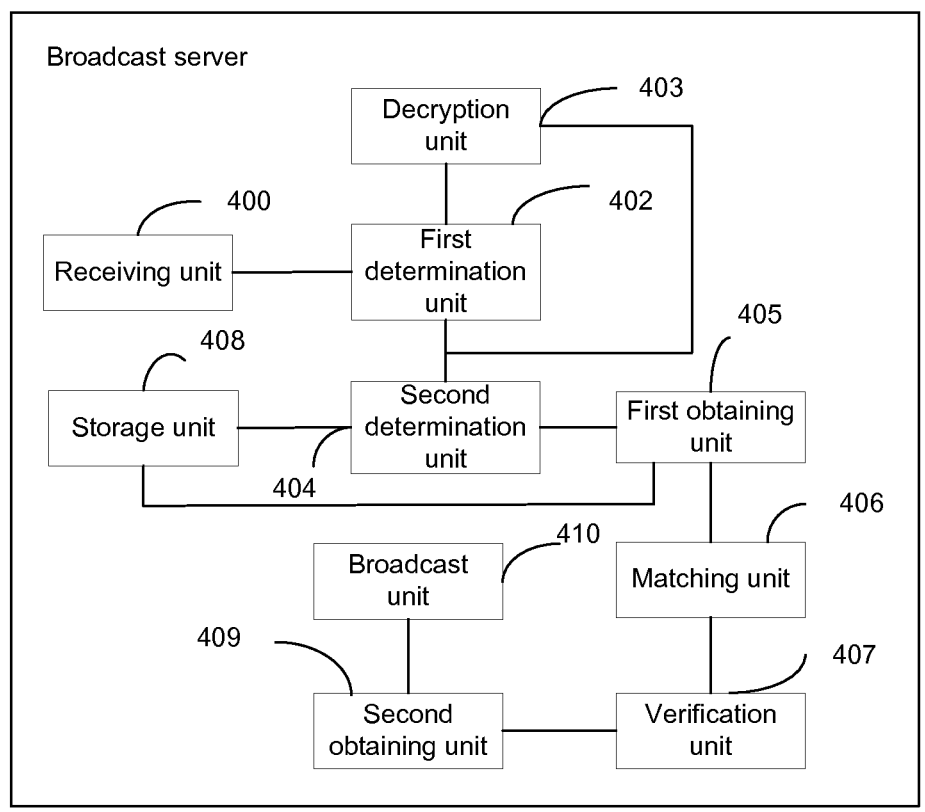
FIG. 4 is another schematic diagram of an exemplary system for broadcasting pictures consistent with the present disclosure.

FIG. 4 shows a schematic diagram for an exemplary broadcast server consistent with the embodiments of the present disclosure. In this example, the broadcast server and multiple user terminals can communicate with each other. The broadcast server includes a receiving unit 400, a first determination unit 402, a decryption unit 403, a second determination unit 404, a first obtaining unit 405, a matching unit 406, a verification unit 407, a second obtaining unit 409, a broadcasting unit 410, and a storage unit 408.

In this embodiment, the receiving unit 400 may receive the broadcasting request from a user terminal. The broadcasting request may include a picture to be broadcasted and a user signature. In this embodiment, when the user terminal receives the user signature from the uploading server, the user terminal may send the pictured to be broadcasted and the user signature to the broadcast server. Further, in this embodiment, the user terminal may insert the user signature into a blank section of the picture file and then send the picture with the inserted signature to the broadcast server.

The first determination unit 402 may determine whether the received user signature needs to be decrypted. In this embodiment, if the user signature has been encrypted with a dynamic encryption key, the user signature may carry an indicator of the encryption. In this case, the first determination unit 402 may base its determination on whether the user signature carries the encryption indicator. The decryption unit 403 may decrypt the user signature when the first determination unit 402 determines that the user signature needs to be decrypted.

If the first determination unit 402 determines no decryption is needed, or after the decryption unit 403 decrypts the user signature, the second determination unit 404 may determine whether the storage unit 408 contains a user signature for the user terminal.

If the second determination unit 404 determines that the storage unit 408 does not contain the user signature, the first obtaining unit 405 may obtain the user signature from the uploading server. In this example, the first obtaining unit 405 may send an instruction to the uploading server. After receiving the instruction, the uploading server may send the user signature to the first obtaining unit 405 of the broadcast server.

The matching unit 406 may compare the user signature obtained from the uploading server to the signature included in the broadcasting request. If the two signatures match, the verification unit 407 may then validate the signature included in the broadcasting request. If the matching unit 406 determines that the two user signatures do not match, then it may determine that the user signature included in the broadcasting request is invalid.

If the verification unit 407 determines that the user signature included in the broadcasting request is valid, the second obtaining unit 409 may obtain the picture submitted by the user terminal from the uploading server. The broadcasting unit 410 may then broadcast the picture.

Alternatively, when the second determination unit 404 determines that the storage unit 408 contains the user signature, the first obtaining unit 405 my retrieve the user signature from the storage unit 408. The matching unit 406 may compare the user signature obtained from the storage unit 408 to the signature included in the broadcasting request. If the two signatures match, the verification unit 407 may then validate the signature included in the broadcasting request. If the matching unit 406 determines that two user signatures do not match, then it may determine that the user signature included in the broadcasting request is invalid. If the verification unit 407 determines that the user signature included in the broadcasting request is valid, the second obtaining unit 409 may obtain the picture submitted by the user terminal from the uploading server. The broadcasting unit 410 may then broadcast the picture.

Embodiments consistent with the present disclosure provide a broadcast server for broadcasting pictures. A user terminal may upload a broadcasting request to the uploading server. The uploading server may generate a user signature and send a copy of the user signature to the broadcast server. The user terminal may send a request to broadcast to the broadcast server. The broadcasting request may include the user signature. If the broadcast server determines that the signature included in the request is valid, the broadcast server may broadcast the picture. Embodiment consistent with the present disclosure may therefore filter out malicious requests by validating user signatures, reduce the impact of malicious broadcasting requests on the system, reduce the cost associated with handling malicious broadcasting requests, and reduce the risk of being attacked by malicious broadcasting requests. Accordingly, embodiments consistent with the present disclosure may improve the user experience in instant message applications.

Figure 5:
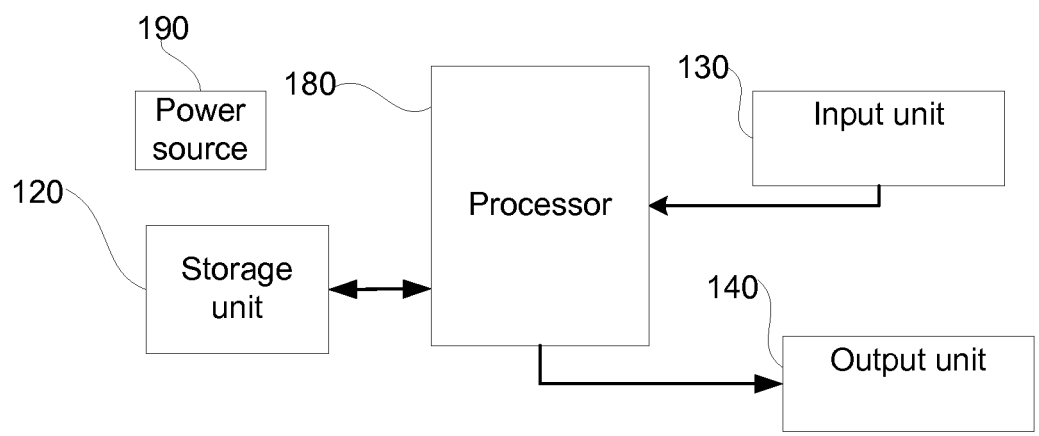
FIG. 5 is a schematic diagram of a server in an exemplary system for broadcasting pictures consistent with the present disclosure.

FIG. 5 shows another exemplary server used in embodiments consistent with the present disclosure. In this embodiment, a server includes one or more storage units 120, an input unit 130, and an output unit 140. The server may further include one or more processors 180 and power source 190. The structure disclosed in relation to FIG. 5 is exemplary, and does not limit the present disclosure.

In some embodiments, the storage unit 120 may store software programs and modules. The processor 180 may operate the software programs and modules stored in the storage unit 120 to process data or to implement certain functions. The storage unit 120 may include areas for storing software programs as well as data. The software program storage area may store one or more operating systems and one or more applications. The data storage area may store the data used by the servers. In addition, the storage unit 120 may include RAMs, non-volatile memories, hard disks, flash disks, or other volatile storage media. The storage unit 120 may further include a controller, which may interact with the processor 180 and the input unit 130.

The input unit 130 may receive input data and generate input based on the input from a keyboard, a mouse, an operating bar, or other optical or touch signal inputs. The processor 180 may control the server, using all interfaces and components to operate the software programs and module stored in the storage unit 120. The processor 180 may further process the data stored in the storage unit 120. The processor 180 controls the server by processing both the software modules and the data. The processor 180 may also include one or more processing units. The server may also include the power source 190. The power source 190 may connect to the processor 180. The processor 180 may manage the power source 190 by implementing a system managing the charging, discharging, and other power management functions. The power source 190 may also include one or more DC or AC power sources, rechargeable power sources, power testing circuits, power converters, or other monitoring components.

In the embodiments consistent with the present disclosure, the input unit 130 may receive the broadcasting request from a user terminal. The broadcasting request may include a user signature. The user signature may be a signature generated by the server based on a picture submitted by the user terminal. The processor 180 may broadcast the picture as requested if it determines that the user signature included in the broadcasting request in valid.

Consistent with embodiments of the present disclosure, one or more non-transitory storage medium storing a computer program are provided to implement the system and method for broadcasting pictures across multiple user terminals. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems, various systems for broadcast videos over multiple user terminals may be implemented. For example, a user may want to broadcast a video to a group of users. The user may use a user terminal to send a broadcasting request with the video file to be broadcasted to an uploading server. The uploading server may generate a user signature based on the identity of the user terminal. The uploading server may then send the user signature to both the user terminal and a broadcast server. The user may then use the user terminal to send a broadcasting request to the broadcast server. The user may include the user signature in the broadcasting request. The broadcast server may receive the broadcasting request and validate the user signature. The broadcast server may compare the signature included in the broadcasting request with the signature received from the uploading server. If the broadcast server determines that the user signature is valid, it may broadcast the video submitted by the user. By managing the user signatures securely, the broadcasting system delivers a secure video broadcasting experience for multiple user terminals and saves network resources.

What is claimed is:

1. A method for broadcasting a picture across multiple user terminals, comprising:
    generating a user signature based on information associated with the picture;
    receiving a request to broadcast the picture, the request including the user signature; and
    broadcasting the picture if the user signature is valid;
    wherein the method further comprises:
        receiving a request to broadcast the picture from a user;
        responding to the request by generating the user signature; and
        sending the user signature to the user;
        determining whether a user signature is stored in a storage unit;
        retrieving the user signature after determining that it is in the storage unit;
        matching the retrieved user signature to the user signature included in the broadcasting request;
        determining the user signature in the broadcasting request is valid if it matches the retrieved user signature;
        obtaining a user signature if the user signature in the broadcasting request is invalid;
        matching the obtained user signature to the user signature included in the broadcasting request; and
        determining the user signature in the broadcasting request is valid if it matches the obtained user signature.

2. The method according to claim 1, wherein the user signature is based on a user identification, a time stamp, and the information associated with the picture.

3. The method according to claim 1, further comprising: storing the picture in a storage unit.

4. The method according to claim 1, further comprising: encrypting the user signature by using a dynamic encryption key.

5. The method according to claim 1, further comprising:
    obtaining the user signature if it is not in the storage unit;
    matching the obtained user signature to the user signature included in the broadcasting request; and
    determining the user signature in the broadcasting request is valid if it matches the obtained user signature.

6. A system for broadcasting a picture across multiple user terminals, comprising:
    a user terminal configured to send a picture to an uploading server;
    an uploading server configured to generate a user signature and send the user signature to the user terminal; and
    a broadcast server configured to receive a request to broadcast from the user terminal with the user signature and broadcast the picture if the use signature sent with the broadcasting request is valid;
    wherein:
    the user terminal sends the request to broadcast the picture to the uploading server and the uploading server generates the user signature based on information related to the picture;
    the broadcast server determines whether a user signature is already stored in a storage unit;
    the broadcast server retrieves the user signature from the storage unit if it is stored in the storage unit, matches the retrieved user signature with the user signature included in the broadcasting request, and determines the user signature included in the broadcasting request is valid if the two user signatures match; and
    if the two user signatures do not match, the broadcast server obtains a user signature from the uploading server, matches the obtained user signature to the user signature included in the broadcasting request, and determines the user signature included in the broadcasting request is valid if it matches the obtained user signature.

7. The system according to claim 6, wherein the user signature is based on a user identification, a time stamp, and the information associated with the picture.

8. The system according to claim 6, wherein the uploading server stores the picture received from the user terminal and sends back the generated user signature to the user terminal.

9. The system according to claim 6, wherein the uploading server encrypts the user signature using a dynamic encryption key.

10. The system according to claim 6, wherein the broadcast server obtains the user signature from the uploading server if the user signature is not stored in the storage unit, matches the obtained user signature with the user signature included in the broadcasting request, and determines the user signature included in the broadcasting request is valid if the two user signatures match.

11. A broadcast server in a picture broadcasting system, comprising one or more processors, memory, and one or more program units stored in the memory and to be executed by the one or more processors, the one or more program units comprising:
- a receiving unit configured to receive a broadcasting request from a user terminal to broadcast a picture, the broadcasting request including a user signature, wherein the user signature is generated by an uploading server based on information associated with the picture; and
- a broadcast unit configured to broadcast the picture if the user signature is valid;
- a first determination unit configured to determine whether the user signature needs to be decrypted;
- a decryption unit configured to decrypt the user signature;
- a second determination unit configured to determine whether a user signature is stored in a storage unit after the user signature is decrypted;
- a first obtaining unit configured to obtain the user signature from the uploading server if the second determination unit determines that the user signature is not stored in the storage unit;
- a matching unit configured to match the obtained user signature with the user signature included in the broadcasting request; and
- a verification unit configured to determine that the user signature included in the broadcasting request is valid if it matches the obtained user signature wherein:
- the first obtaining unit retrieves the user signature from the storage unit if the second determination unit determines that the user signature is stored in the storage unit the matching unit matches the retrieved user signature with the user signature included in the broadcasting request the verification unit determines the user signature included in the broadcasting request is valid if the two user signatures match; and
- if the two user signatures do not match, the first obtaining unit obtains a user signature from the uploading server, the matching unit matches the obtained user signature to the user signature included in the broadcasting request, and the verification unit determines the user signature included in the broadcasting request is valid if it matches the obtained user signature.

12. The broadcast server according to claim 11, further comprising:
- a second obtaining unit configured to obtain the picture from the uploading server if the user signature included in the broadcasting request is valid, wherein the broadcast unit broadcasts the obtained picture.

* * * * *